(12) United States Patent
Ward

(10) Patent No.: US 7,242,557 B2
(45) Date of Patent: Jul. 10, 2007

(54) RESIDUAL CURRENT DEVICE WITH DOUBLE GROUNDED NEUTRAL FAULT DETECTION

(75) Inventor: Patrick Ward, Ballinasloe (IE)

(73) Assignee: ShaKira Limited, Galway (IE)

( * ) Notice: Subject to any disclaimer, the term of this patent is extended or adjusted under 35 U.S.C. 154(b) by 3 days.

(21) Appl. No.: 11/192,186

(22) Filed: Jul. 29, 2005

(65) Prior Publication Data

US 2006/0034024 A1 Feb. 16, 2006

(30) Foreign Application Priority Data

Aug. 11, 2004 (IE) .............................. S2004/0539

(51) Int. Cl.
*H02H 3/00* (2006.01)
*H02H 9/08* (2006.01)
(52) U.S. Cl. .......................................... 361/42; 361/44
(58) Field of Classification Search ................ 361/42, 361/44
See application file for complete search history.

(56) References Cited

U.S. PATENT DOCUMENTS 6,639,769 B2 * 10/2003 Neiger et al. .................. 361/42
6,850,394 B2 * 2/2005 Kim ............................ 361/42

* cited by examiner

*Primary Examiner*—Stephen W. Jackson
*Assistant Examiner*—Dharti H. Patel
(74) *Attorney, Agent, or Firm*—The Nath Law Group; Jerald L. Meyer; Matthew J. Moffa

(57) ABSTRACT

A residual current device (RCD) senses a differential current flowing in A.C. mains supply live and neutral conductors and disconnects the supply from a load when the differential current exceeds a predetermined level. The device further includes a circuit for detecting a double grounded neutral fault in which current flows in an N-E loop formed by a double grounded neutral. The current is sensed as a differential current and detected as a correspondence between causing the current to flow and sensing the differential current.

3 Claims, 3 Drawing Sheets

RESIDUAL CURRENT DEVICE WITH DOUBLE GROUNDED NEUTRAL FAULT DETECTION

This invention relates to a residual current device (RCD) with means for detecting a double grounded neutral fault.

Figure 1:
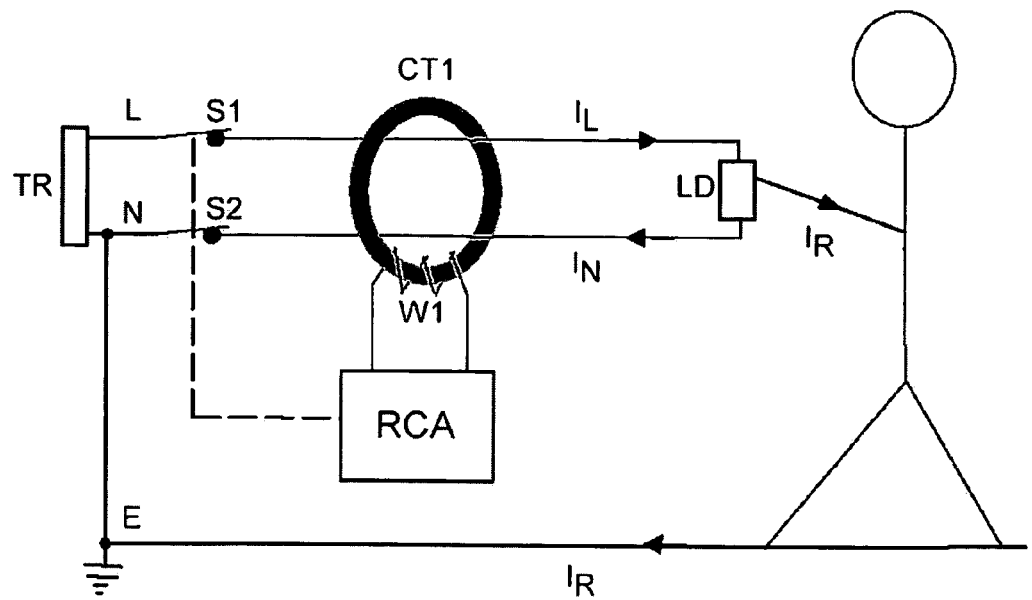

FIG. 1 represents an electrical installation which is protected by an RCD (also known as a Ground Fault Interrupter, GFI). The circuit of FIG. 1 represents a typical single phase TN installation comprising live L and neutral N conductors supplying a load LD, for example a domestic appliance. The transformer TR converts the high voltage A.C. from the electricity distribution system (not shown) to the normal low mains voltage of, for example, 230v or 110v. The supply neutral is connected directly to earth, and a solid earth conductor E is distributed throughout the installation. The installation is protected by an RCD as shown.

Under normal conditions, a current IL flows from the supply in the live conductor L to the load and returns to the supply as $I_N$ in the neutral conductor N. The RCD includes a current transformer CT1 through which the live and neutral conductors pass on their way to and from the load LD, and constitute the primary windings of CT1. CT1 has a secondary winding W1 whose output is connected to a residual current actuator RCA, typically comprising a WA030 or WA050 integrated circuit. Normally, in the absence of a residual current, the currents $I_L$ and $I_N$ in the conductors L and N are the same magnitude but flow in opposite directions, and as a result the vector sum of these currents is zero at CT1 and no current is induced into the secondary winding W1.

However, if a person touches a live part, as indicated at the right hand side of FIG. 1, a current $I_R$ will flow through the person's body to earth and return to the supply via the earth return path. The current $I_L$ will now be greater than $I_N$ and CT1 will produce a resultant output from W1 in response to this differential or residual current. This output will be detected by the residual current actuator RCA, and if above a predetermined threshold level, will cause the actuator to open contacts S1 and S2 and disconnect the supply from the load and thereby provide protection. This type of RCD is extremely well-known and no further details are necessary.

Figure 2:
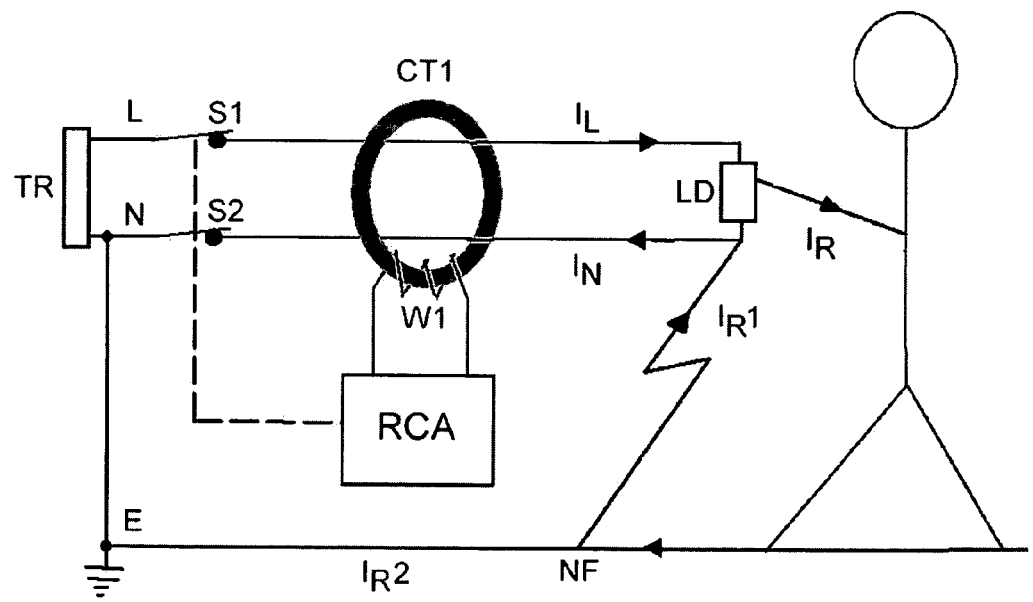

The key factor in the ability of the RCD to detect a residual current and provide protection is the connection of the supply neutral conductor to earth at the origin of the installation. However, the earthed neutral arrangement can also be a factor in the RCD being prevented from performing this vital task. FIG. 2 shows how a second connection between N and E can disable the RCD.

In the circuit of FIG. 2, the load side neutral conductor N has been inadvertently connected to earth. Such a condition is often referred to as a double grounded neutral fault, and is indicated by NF in the drawings. Such a fault could occur due to an insulation breakdown or mis-wiring of the load. Under this condition, the current $I_R$ flowing through the body will see a junction at the load side neutral-earth connection. The current $I_R$ will now split into two components, $I_R1$ and $I_R2$, with $I_R1$ returning to the supply via the neutral conductor N as shown. Thus, CT1 will now see a residual current of magnitude $I_R2$ instead of the full body current $I_R$. If the current $I_R2$ is below the actuation threshold of the RCA, the RCD will not trip and the fault current will be allowed to flow through the body without interruption.

The division of the current $I_R$ will be determined by the relative impedances of the earth and neutral return paths. In a TN installation, it is not uncommon for the earth conductor to to be of smaller cross sectional area than that of the neutral conductor, in which case the earth return impedance will be greater than that of the neutral, possibly several times greater, with the result that a relatively small portion of the earth fault current will be seen as a residual current by the RCD under a double grounded neutral fault condition.

However, on a TT installation, this problem is compounded by the fact that such installations generally do not use a solid conductor throughout the earth return path. In such installations, the neutral is usually connected to earth at the origin of the installation, and a subsequent connection is made to earth at the load by way of an earth probe inserted into the ground. In such installations, the impedance of the earth return path is determined by the nature of the soil or ground in the earth return path, the length of the earth return path (which is sometimes indeterminate), and environmental factors such as wet or dry weather, etc. As a result, the impedance of the earth return path in TT installations will usually be measurable in ohms, and will often be of the order of tens of ohms. This can result in the earth return path having an impedance many times higher than that of the neutral conductor.

In each case, TN and TT, double grounding of the neutral results in a reduction in the residual current seen by the CT, with a resultant increased risk of non functioning of the RCD under an earth fault condition. This risk is perceived as being unacceptable in some countries with the result that they have a requirement that RCDs fitted in such countries are required to trip automatically in response to a double grounded neutral fault or be able to continue to provide protection under such a fault condition.

Figure 3:
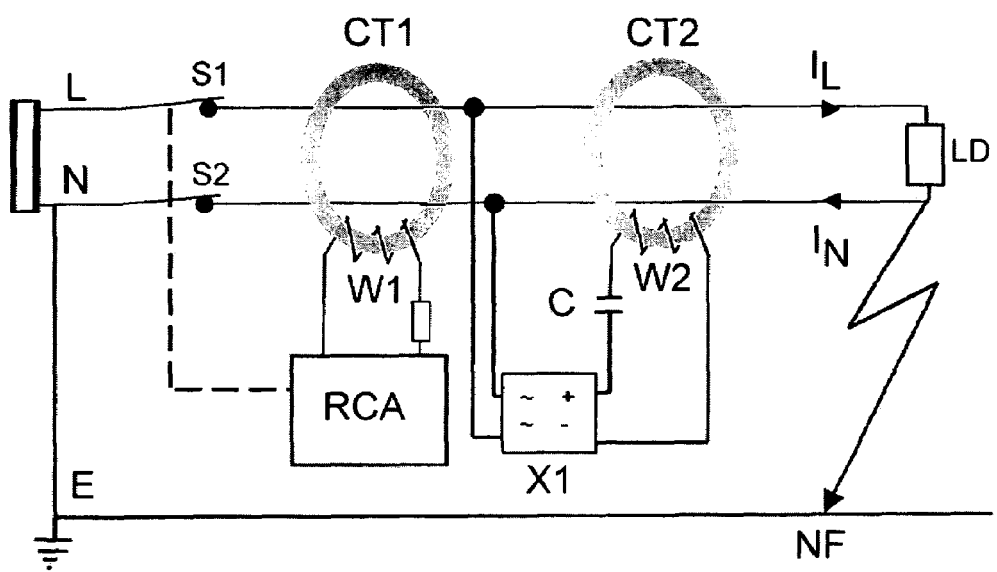

Means to detect a double grounded neutral condition are well known, and generally require the use of a second CT in the RCD as shown in FIG. 3. In FIG. 3, the double grounded neutral detection circuit comprises a second current transformer CT2 surrounding the live and neutral conductors L, N and a winding W2 similar to the winding W1, one end of the winding W2 being connected to the positive output of a full wave bridge rectifier X1 via a capacitor C and the other end of the winding W2 being connected to the common or negative output of the bridge rectifier.

The bridge rectifier X1 produces a full wave rectified output with positive only going pulses at twice the A.C. supply frequency, e.g. 100 Hz for a supply frequency of 50 Hz. The winding W2 combined with the CT2 core constitutes an inductance, and combined with capacitor C, these two reactive elements form an LC oscillatory circuit. This circuit is provided with energy by the bridge rectifier, and observation of the junction of C and W2 reveals a series of resonant pulses which are induced in the LC circuit by the rectified A.C. supply, the pulses having a frequency substantially greater than the rectified A.C. frequency and being a function of the L and C values of the oscillatory circuit. The frequency of the resonant pulses is typically 1.5 KHz. In the event of a double grounded neutral fault NF, a closed loop will be formed running from the earthed neutral at the supply transformer through CT1 and CT2 to the load LD and from there via the earth return path back to the earthed supply neutral. This is known as an N-E loop or current path. The resonant pulses in winding W2, acting as a primary winding, induce a current into the N-E loop, acting as a secondary winding, which in turn induces a current into the secondary winding W1 of CT1. The current induced in the winding W1, which is at the frequency of the resonant pulses, is detected by the RCA, which in turn activates a contact opening device to cause the contacts S1 and contacts S1 and S2 to open automatically in response to the fault NF.

A disadvantage of such an RCD circuit is that the user has no way of knowing whether the RCD tripped in response to an earth fault current or in response to a double grounded neutral condition. Means to distinguish between the two fault conditions could be very helpful in achieving speedy detection and rectification of the fault. It is an object of this invention to provide an RCD with an improved double grounded neutral fault detector, in particular but not necessarily for providing an indication when tripping has occurred specifically in response to a double grounded neutral fault.

According to the present invention there is provided a residual current device (RCD) including means for sensing a differential current flowing in A.C. mains supply live and neutral conductors and for disconnecting the supply from a load when the differential current exceeds a predetermined level, the device further including a circuit for detecting a double grounded neutral fault comprising means for causing a current to flow in the N-E loop formed by a double grounded neutral, the current being sensed as a differential current by the sensing means, and means for detecting correspondence between causing the current to flow and sensing the differential current.

In an embodiment the means for causing a current to flow in the N-E loop comprises means for inducing an A.C. current in the loop having a frequency substantially higher than the supply frequency, and the means for detecting correspondence comprises means for detecting a differential current having substantially the same frequency as that of the induced current.

Preferably, the means for detecting correspondence comprises a filter to eliminate supply frequency signals from the output of the sensing means and means responsive to both the filter output and the A.C. current inducing means to generate a signal when the two are coincident.

Most preferably the device includes an indicator which is set upon detecting correspondence as aforesaid.

An embodiment of the invention will now be described, by way of example, with reference to the accompanying drawings, in which:

FIGS. 1 and 2, previously described, are circuit diagrams of a conventional RCD respectively without and with a double grounded neutral fault.

FIG. 3, previously described, is a circuit diagram of an RCD of the kind shown in FIGS. 1 and 2 having a conventional double grounded neutral fault detector.

Figure 4:
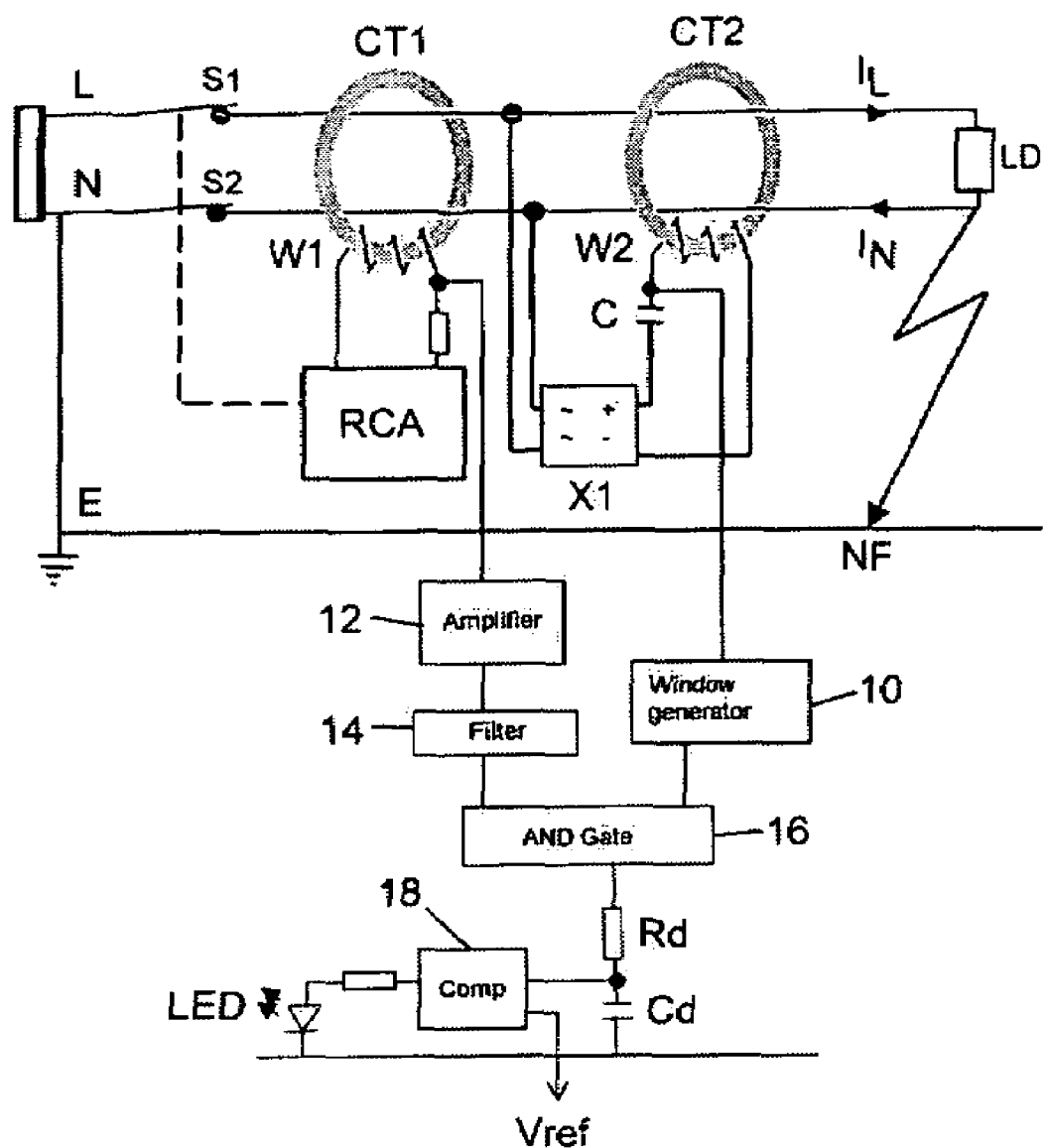

FIG. 4 is a circuit diagram of an RCD having a double grounded neutral fault detector and indicator according to an embodiment of the invention.

Referring to FIG. 4, the double grounded neutral fault detector and indicator circuit comprises a window generator 10, an amplifier 12, a band pass filter 14, an AND gate 16, a comparator 18, and a light emitting diode LED. The resonant pulses that appear at the junction of C and W2 are fed to the window generator 10. These resonant pulses are not continuous, but occur in bursts just after each alternate half cycle of the rectified A.C. mains supply. The window generator 10 has a voltage reference level, and when the amplitude of a resonant pulse exceeds this level the window generator provides an generator provides an output to provide a square wave inspection window. Thus each burst of resonant pulses gives rise to a corresponding series of inspection windows at the same frequency as, and individually coincident with respective ones of, the resonant pulses. Because of the relatively high frequency of the resonant pulses, e.g. 1.5 KHz, and by choosing an appropriate setting of the voltage reference level, each window can be made to have a very short duration.

Under a double grounded neutral condition NF, the resonant pulses in the LC circuit formed by C and W2 induce oscillatory pulses at the same frequency in the N-E loop, and these in turn induce pulses at the same frequency into the secondary winding W1 of CT1. In addition to being fed to the residual current actuator RCA in the normal way, these pulses are fed to the amplifier 12, and then via the band pass filter 14 to one input of the AND gate 16 (the amplifier 12 ensures that the pulses are at the correct voltage to register at the input of the AND gate). The pass band of the band pass filter 14 is centred on the frequency of the resonant pulses generated in the LC circuit formed by C and W2, i.e. 1.5 KHz in the present embodiment, and ensures that only pulse signals having substantially the same frequency as the resonant pulses are passed to the AND gate 16.

The square wave inspection window pulses produced by the window generator 10 are applied to the other input of the AND gate 16, so that when a pulse from the filter 14 coincides with an inspection window pulse, the AND gate output goes high. Each output pulse produced by the AND gate 16 charges a capacitor Cd via a resistor Rd. After the receipt of a certain number of pulses from the AND gate, the voltage on Cd will exceed that of the reference voltage $V_{ref}$ on the comparator 18, and the output of the latter will go high, lighting the LED. At the same time, the pulses induced into W1 by the oscillatory pulses W1 by the oscillatory pulses induced in the N-E loop is detected and processed by the RCA. When a certain number of these pulses have been detected by the RCA, it will activate the contact opening means to open the contacts S1 and S2 and so trip the RCD. The requirement for a plurality of pulses to be output from the AND gate 16 before the LED is lit, and for a number of pulses to be detected by the RCA before the contacts are opened, mitigates against spurious operation due to voltage spikes and the like.

Due to the band pass filter 14, signals induced in W1 at frequencies not substantially the same as that of the resonant pulses generated in the LC circuit formed by C and W2 will not be fed to the AND gate 16, with the result that the LED will not be lit by a residual current arising from a supply frequency ground fault. Thus the circuit provides a means of determining when the RCD has tripped due to a double grounded neutral condition.

The RCA and double grounded neutral circuitry is normally powered from the rectified mains supply, which in turn is smoothed by a storage capacitor (the power supply connections for the RCA are not shown). Although power will be removed from the circuitry when the contacts open, the storage capacitor will provide power to the circuitry for a sufficiently long period to ensure visibility of the LED lighting up. If the double grounded neutral fault is not removed prior to reclosing of the contacts, the RCD will automatically trip again and the LED will momentarily light up again. In the circuit of FIG. 4, the circuitry is shown as being supplied with power from the load side of the contacts. The circuitry can alternatively be supplied with power from the supply side of the contacts without impairing the operation of the circuit.

In some cases, users prefer the RCD to remain passive and not to automatically trip in response to a double grounded neutral fault. In such cases it is important that the RCD is not overly desensitised and that it can still provide protection against supply-frequency residual currents under the double grounded neutral condition. Under such an arrangement, the RCA will not respond to the double grounded neutral fault, but the double grounded neutral detection will still operate and the LED will light but remain lit.

The integrated circuits (ICs) used in some RCAs may be unable to provide automatic tripping under double grounded neutral conditions. Where automated tripping is required in response to a double grounded neutral condition by an RCA using such an IC, the output of the comparator 18 can be connected to the contact opening means to ensure automatic tripping under this condition. Under such an arrangement, the double grounded neutral indication circuit performs the dual functions of detection and indication. If indication is not required, the circuit can be used as a stand alone double grounded neutral detection circuit for use with RCDs unable to provide automatic tripping under double grounded neutral conditions.

The foregoing detection and indication circuit may be incorporated into a stand alone application specific integrated circuit (ASIC), or be incorporated with the RCA in a single IC.

The invention is not limited to RCDs whose double grounded neutral detector comprises a current transformer such as CT2. For example, the invention is applicable to the RCDs described in Irish Patent No. S83512. FIG. 5 of that application discloses a circuit in which the live and neutral conductors are intermittently connected together on the load side of the main RCD current transformer CT1. Each time this occurs a current will flow in the N-E loop formed by a double grounded neutral, and this will be sensed by the RCD comprising CT1 and the RCA. It will be evident that a comparison circuit can be used to determine when a differential current is sensed by CT1 coincident with a current flow in the N-E loop, and light an LED accordingly.

The invention is not limited to the embodiments described herein which may be modified or varied without departing from the scope of the invention.

The invention claimed is:

1. A residual current device (RCD) including means for sensing a differential current flowing in A.C. mains supply live and neutral conductors and for disconnecting the supply from a load when the differential current exceeds a predetermined level, the device further including a circuit for detecting a double grounded neutral fault comprising means for causing a current to flow in an N-E loop formed by a double grounded neutral, the current being sensed as a differential current by the sensing means, means for detecting correspondence between causing the current to flow and sensing the differential current, and an indicator which is set upon detecting said correspondence.

2. A device as claimed in claim 1 wherein the means for causing a current to flow in the N-E loop comprises means for inducing an A.C. current in the loop having a frequency substantially higher than the supply frequency, and the means for detecting correspondence comprises means for detecting a differential current having substantially the same frequency as that of the induced current.

3. A device as claimed in claim 2 wherein the means for detecting correspondence comprises a filter to eliminate supply frequency signals from an output of the sensing means and means responsive to both an output of said filter and the A.C. current inducing means to generate a signal when the two are coincident.

* * * * *